United States Patent
Barty

(10) Patent No.: US 8,934,608 B2
(45) Date of Patent: Jan. 13, 2015

(54) HIGH FLUX, NARROW BANDWIDTH COMPTON LIGHT SOURCES VIA EXTENDED LASER-ELECTRON INTERACTIONS

(75) Inventor: Christopher P. Barty, Hayward, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 349 days.

(21) Appl. No.: 13/552,610

(22) Filed: Jul. 18, 2012

(65) Prior Publication Data
US 2013/0003935 A1 Jan. 3, 2013

Related U.S. Application Data

(63) Continuation-in-part of application No. 12/506,639, filed on Jul. 21, 2009, now Pat. No. 8,369,480, which is a continuation-in-part of application No. 11/528,182, filed on Sep. 26, 2006, now Pat. No. 7,564,241.

(60) Provisional application No. 61/509,479, filed on Jul. 19, 2011, provisional application No. 60/720,965, filed on Sep. 26, 2005.

(51) Int. Cl.
*H05G 1/02* (2006.01)
*G01V 5/00* (2006.01)
*H05G 2/00* (2006.01)

(52) U.S. Cl.
CPC ............. *G01V 5/0008* (2013.01); *H05G 2/008* (2013.01)
USPC ........................................................ 378/119

(58) Field of Classification Search
CPC .................................... H05G 2/008
USPC .......................................................... 378/119
See application file for complete search history.

(56) References Cited

U.S. PATENT DOCUMENTS 3,780,294 A    12/1973  Sowerby
4,598,415 A *   7/1986  Luccio et al. ................. 378/119
5,040,200 A    8/1991  Ettinger et al.
(Continued)

FOREIGN PATENT DOCUMENTS

WO    2005081017    1/2005
WO    2007038527    4/2007
(Continued)

OTHER PUBLICATIONS

Boucher, S., et al., "Inverse compton scattering gamma ray source", Nuclear Instruments and Methods in Physics Research, A 608, 2008, pp. S54-S56.
(Continued)

*Primary Examiner* — Thomas R Artman
(74) *Attorney, Agent, or Firm* — John P. Wooldridge

(57) ABSTRACT

New configurations of lasers and electron beams efficiently and robustly produce high flux beams of bright, tunable, polarized quasi-monoenergetic x-rays and gamma-rays via laser-Compton scattering. Specifically, the use of long-duration, pulsed lasers and closely-spaced, low-charge and low emittance bunches of electron beams increase the spectral flux of the Compton-scattered x-rays and gamma rays, increase efficiency of the laser-electron interaction and significantly reduce the overall complexity of Compton based light sources.

22 Claims, 7 Drawing Sheets

(56) References Cited

U.S. PATENT DOCUMENTS

| | | | |
|---|---|---|---|
| 5,115,459 | A | 5/1992 | Bertozzi |
| 5,247,562 | A * | 9/1993 | Steinbach ............... 378/119 |
| 5,293,414 | A | 3/1994 | Ettinger et al. |
| 5,323,004 | A | 6/1994 | Ettinger et al. |
| 5,353,291 | A * | 10/1994 | Sprangle et al. ............ 372/5 |
| 5,420,905 | A | 5/1995 | Bertozzi |
| 6,035,015 | A * | 3/2000 | Ruth et al. ............... 378/119 |
| 6,442,233 | B1 | 8/2002 | Grodzins et al. |
| 6,661,818 | B1 | 12/2003 | Feldman et al. |
| 6,684,010 | B1 | 1/2004 | Morris et al. |
| 6,687,333 | B2 | 2/2004 | Carroll et al. |
| 7,060,983 | B2 | 6/2006 | Turner |
| 7,120,226 | B2 | 10/2006 | Ledoux et al. |
| 7,277,526 | B2 * | 10/2007 | Rifkin et al. ............. 378/119 |
| 7,391,850 | B2 * | 6/2008 | Kaertner et al. .......... 378/118 |
| 7,564,241 | B2 | 7/2009 | Barty et al. |
| 7,596,208 | B2 | 9/2009 | Rifkin et al. |
| 7,693,262 | B2 | 4/2010 | Bertozzi et al. |
| 8,369,480 | B2 * | 2/2013 | Barty ........................ 378/57 |
| 2004/0109532 | A1 | 6/2004 | Ford |
| 2005/0179911 | A1 | 8/2005 | Boomgarden et al. |
| 2006/0166144 | A1 | 7/2006 | Te Kolste et al. |
| 2006/0188060 | A1 | 8/2006 | Bertozzi et al. |
| 2006/0193433 | A1 | 8/2006 | Ledoux et al. |
| 2006/0251217 | A1 | 11/2006 | Kaertner et al. |
| 2007/0263767 | A1 | 11/2007 | Brondo, Jr. |
| 2009/0147920 | A1 | 6/2009 | Barty et al. |

FOREIGN PATENT DOCUMENTS

| | | |
|---|---|---|
| WO | 2009086503 | 7/2009 |
| WO | 2009097052 | 8/2009 |
| WO | 2011071563 | 6/2011 |

OTHER PUBLICATIONS

Gibson, D.J., et al., "Design and operation of a tunable MeV-level Compton-scattering-based x-ray source", The Americal Physical Society, Physical Review and Special Topics—Accelerators and Beams, 13, 2010, 12 p.

Hagmann, C.A., et al., "Transmission-based detection of nuclides with nuclear resonance fluorescence using a quasimonoenergetic photon source", J. Appl. Phys., vol. 106, 2009, pp. 1-7.

Jovanovic, I, et al., "High-power picosecond pulse recirculation for inverse compton scattering", Nuclear Physics B, 184, 2008, pp. 289-294.

Shverdin, M.Y., et al., "High-power picosecond laser pulse recirculation", Optics Letters, vol. 35, No. 13, 2010, pp. 2224-2226.

Zamfir, N.V., et al., "Extreme light infrastructure: nuclear physics", Proc. of SPIE, vol. 8080, pp. 1-8.

International Search Report and Written Opinion for PCT/US2012/047483 related to U.S. Appl. No. 13/552,610, 9 pages.

* cited by examiner

HIGH FLUX, NARROW BANDWIDTH COMPTON LIGHT SOURCES VIA EXTENDED LASER-ELECTRON INTERACTIONS

CROSS-REFERENCE TO RELATED APPLICATIONS

This application claims the benefit of U.S. Provisional Patent Application No. 61/509,479 titled "High Flux, Narrow Bandwidth Compton Light Sources Via Asymmetrical Laser-Electron Interactions," filed Jul. 19, 2011, incorporated herein by reference. This application is a continuation-in-part (CIP) of U.S. patent application Ser. No. 12/506,639, titled "Dual Isotope Notch Observer for Isotope Identification, Assay and Imaging with Mono-Energetic Gamma-Ray Sources" filed Jul. 21, 2009, incorporated herein by reference. U.S. patent application Ser. No. 12/506,639 is a CIP of U.S. patent application Ser. No. 11/528,182, titled "Isotopic Imaging Via Nuclear Resonance Fluorescence with Laser-Based Thomson Radiation" filed Sep. 26, 2006, incorporated herein by reference, now U.S. Pat. No. 7,564,241, which claims priority to U.S. Provisional Patent Application No. 60/720,965 filed Sep. 26, 2005, incorporated herein by reference.

STATEMENT REGARDING FEDERALLY SPONSORED RESEARCH OR DEVELOPMENT

The United States Government has rights in this invention pursuant to Contract No. DE-AC52-07NA27344 between the U.S. Department of Energy and Lawrence Livermore National Security, LLC, for the operation of Lawrence Livermore National Laboratory.

BACKGROUND OF THE INVENTION

1. Field of the Invention

The present invention relates to Compton light sources, and more specifically, it relates to pulse formats and interaction geometries that produce ultra narrow bandwidth (10E-3 or lower) and high beam flux quasi-mono-energetic x-rays and gamma rays.

2. Description of Related Art

Gamma-rays and x-rays can be produced via laser Compton scattering in which an energetic laser pulse collides with a relativistic bunch of electrons which have been produced by a particle accelerator. The output of this interaction is up-shifted light that is directed in the direction of the electron beam. The energy of the up-shifted light in a head-on collision is equal to the incident laser photon energy multiplied by 4 times the normalized energy of the electron squared. Up-shifts of a million can be created by electrons with energy of a few hundred MeV. The scattered light is polarized and tunable by changing either the color of the laser photon or the energy of the electron bunch. The output is polychromatic but with a spectrum that is angle correlated. By passing the beam through a narrow aperture a quasi-mono-energetic beam can be created with a bandwidth that is dependent linearly upon the laser bandwidth, linearly upon the electron bunch energy spread and upon the focusing geometry of the electron beam and the laser beam.

Laser-Compton light sources have been constructed primarily to create short duration x-rays or tunable, relatively broadband x-rays. In these systems, the laser pulse duration is of order or shorter in duration than that of the electron bunch and both are focused to a small spot in order to maximize the interaction and the total photon yield. The Compton scattering cross section (also known as the Thomson cross section) is very small, $\sim 6 \times 10^{25}$ cm$^2$. Note in Compton scattering, of the order of $10^{19}$ laser photons interact with the order of $10^{10}$ electrons to produce of the order of $10^{10}$ up-scattered x-rays or gamma-rays. To first order, no laser photons are used. Because of the tight focus, the longitudinal transit time of the electrons through the focal region is typically of order the duration of the electron bunch. In this scenario the laser pulse and electron bunch timing must be carefully adjusted so that both pulses overlap at a common focus in space. Furthermore both the laser pulse energy and the electron beam charge are made as high as practical to increase the probability of interaction. and the flux of the outgoing beam. This process can also be used to make gamma-rays simply by increasing the energy of the electron beam. The generation of gamma-rays can be more efficient in that higher energy electron beams can be focused to smaller spots, thus producing more up-scattered photons. Because of the large laser bandwidth used, the relatively large energy spread of the high charge electron bunches and the tight focusing geometries employed in these systems, the fractional bandwidth of typical laser Compton light sources has been of order 10%. (Measurements from systems at Duke University, the Japanese Atomic Research Agency in Japan and at Lawrence Livermore National Laboratory (LLNL) are in this range).

However for many gamma-ray applications the primary beam quality of interest is not beam pulse duration or even total beam flux but is instead gamma-ray bandwidth. It is desirable to provide gamma-rays with fractional bandwidths of 10E-3 or less for use to uniquely excite narrow band (10E-6) nuclear resonances that are unique signatures of isotopes. By monitoring the absorption of resonance photons from such a laser-Compton gamma-ray beam, one can detect, assay or image the presence of specific isotopes in complex systems. Applications include homeland security, nuclear fuel management, industrial materials processing and medical therapy and radiography.

SUMMARY OF THE INVENTION

The invention produces high flux beams of bright, tunable, polarized quasi-monoenergetic x-rays or gamma-rays via laser-Compton scattering x-ray or gamma-ray. An electron source generates a train of spaced electron bunches and an RF linear accelerator accelerated the electron bunches into a laser-electron beam interaction region. The transit time of each of the accelerated electron bunches through the laser-electron beam interaction region is both greater than the duration of the accelerated electron bunch and greater than the spacing between electron bunches. A laser system is adapted to produce a laser pulse having a duration at least as long as a transit time of the laser pulse through the laser-electron beam interaction region. The laser system is arranged so that the laser pulse traverses the laser-electron beam interaction region to interact with all of the accelerated electron bunches of the train. In some embodiments, the duration of the laser pulse is substantially equal to at least a total length of the train of spaced electron bunches so that a single pass of the laser pulse through the laser-electron beam interaction region interacts with all of the accelerated electron bunches of the train. In other embodiments, the duration of the laser pulse is substantially equal to a sub-multiple of a total length of the train of spaced electron bunches. The laser system is arranged to recirculate the laser pulse through the laser-electron beam interaction region for a predetermined number of passes equal to an inverse of the sub-multiple. The spacing frequency of the electron bunches can the same as or correlated to the RF frequency of the RF linear accelerator so that an electron bunch is present for every cycle of said RF frequency.

The invention is useful in the generation of narrowband, high flux mono-energetic gamma-rays and x-rays. Uses of the gamma-rays include isotope specific material detection, assay and imaging via excitation of nuclear resonance fluorescence, photo-fission of materials, medical imaging and therapy. X-ray uses include precision radiography, low dose radiography and targeted radio-therapy.

BRIEF DESCRIPTION OF THE DRAWINGS

The accompanying drawings, which are incorporated into and form a part of the disclosure, illustrate embodiments of the invention and, together with the description, serve to explain the principles of the invention.

DETAILED DESCRIPTION OF THE INVENTION

The invention provides a new pulse format and interaction geometry that produces both ultra-narrow bandwidth (10E-3 or lower) and high beam flux quasi-mono-energetic x-rays and gamma-rays. The basic idea has three components: 1) distribute the charge of the electron bunch over many smaller charge bunches, 2) increase the focal spot size of the interaction so that the transit time of the electron bunch through the interaction region is significantly longer than the duration of the electron bunch and significantly longer than the spacing between successive electron bunches and 3) use a long duration laser pulse whose pulse duration is chosen to be as long or longer than the transit time of the laser through the interaction region. In this way one laser pulse can interact with many (e.g., 100 or more) electron bunches at one time thus producing a high flux (in fact higher than the conventional geometry if the laser energy is adjusted correctly). Furthermore the long duration laser pulse has narrower bandwidth than short duration laser pulses thus the gamma-ray bandwidth contribution from the laser is reduced (typically by a 1000 fold). Furthermore because the bunch charge of the electrons is smaller, the space charge dependent energy dispersion of the bunch is smaller and the energy spread is smaller, thus the e-beam contribution to the gamma-ray bandwidth is reduced (typically by a factor of 10 or more). Further, because the bunch charge is smaller, the quality of the electron beam is higher, i.e., the emittance which is typically proportional to square root of charge is lower. Lower emittance beams can be focused to a given spot size for a longer length. This leads to a longer and more collimated laser-electron beam interaction which in turn reduces the focusing contribution to gamma-ray bandwidth (typically another factor of 10). Finally because the electron beam and laser foci are relatively large and the laser pulse duration is relatively long, the intensity of the laser pulse in the interaction region is reduced (100 fold or more) and thus non-linear effects which tend to broaden the bandwidth of gamma-ray sources are also reduced dramatically. One might not need to focus the electron beam at all out of the accelerator, only the laser beam. In some x-band structures the beam diameter can be 100 microns right out of the device and this is approximately the laser diameter in the focal region. Not having to focus the electron beam means that there is no need for focusing quadrupoles, thus saving space and complexity.

Figure 1:
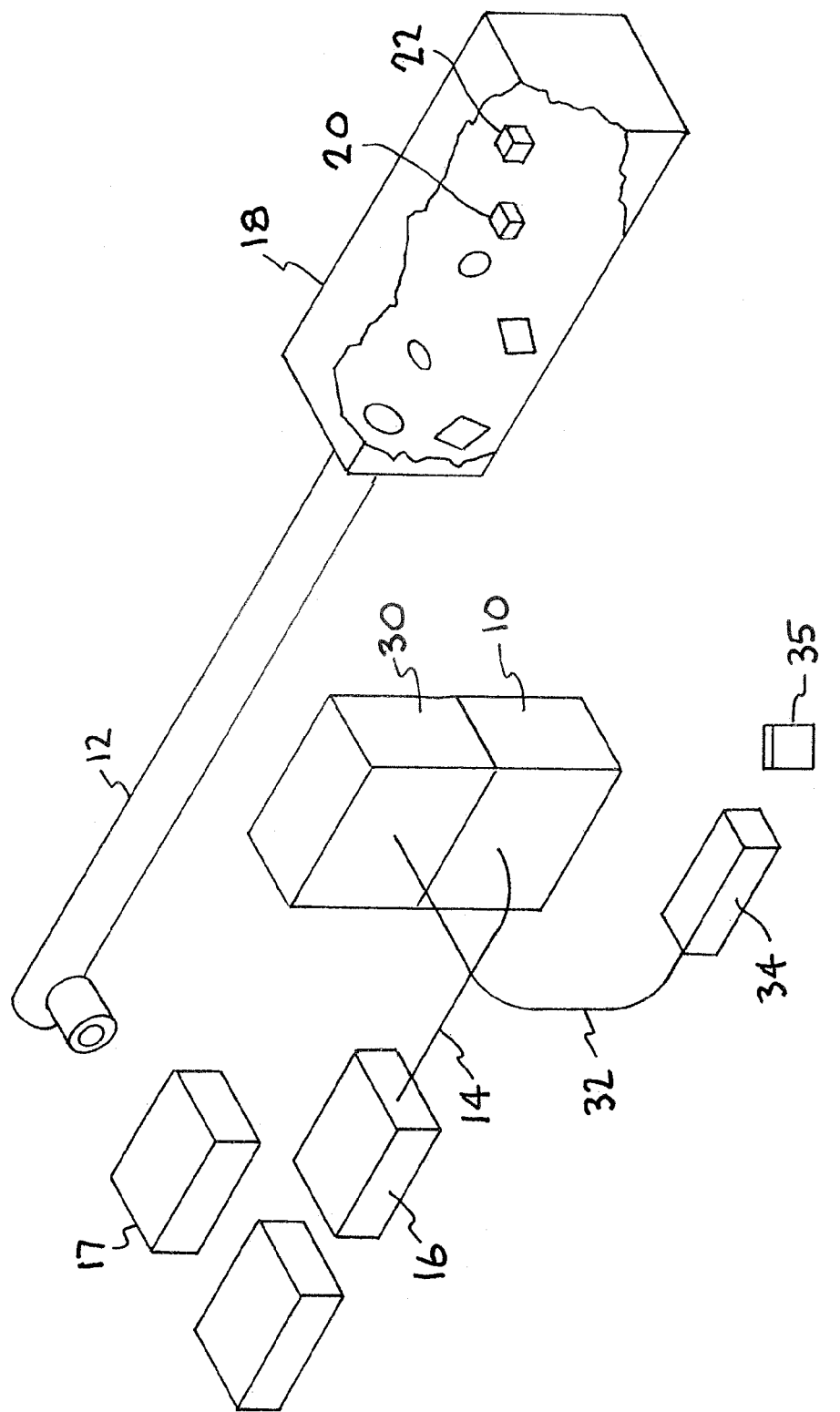
FIG. 1 shows the basic components of an embodiment of the invention.
Figure 2:
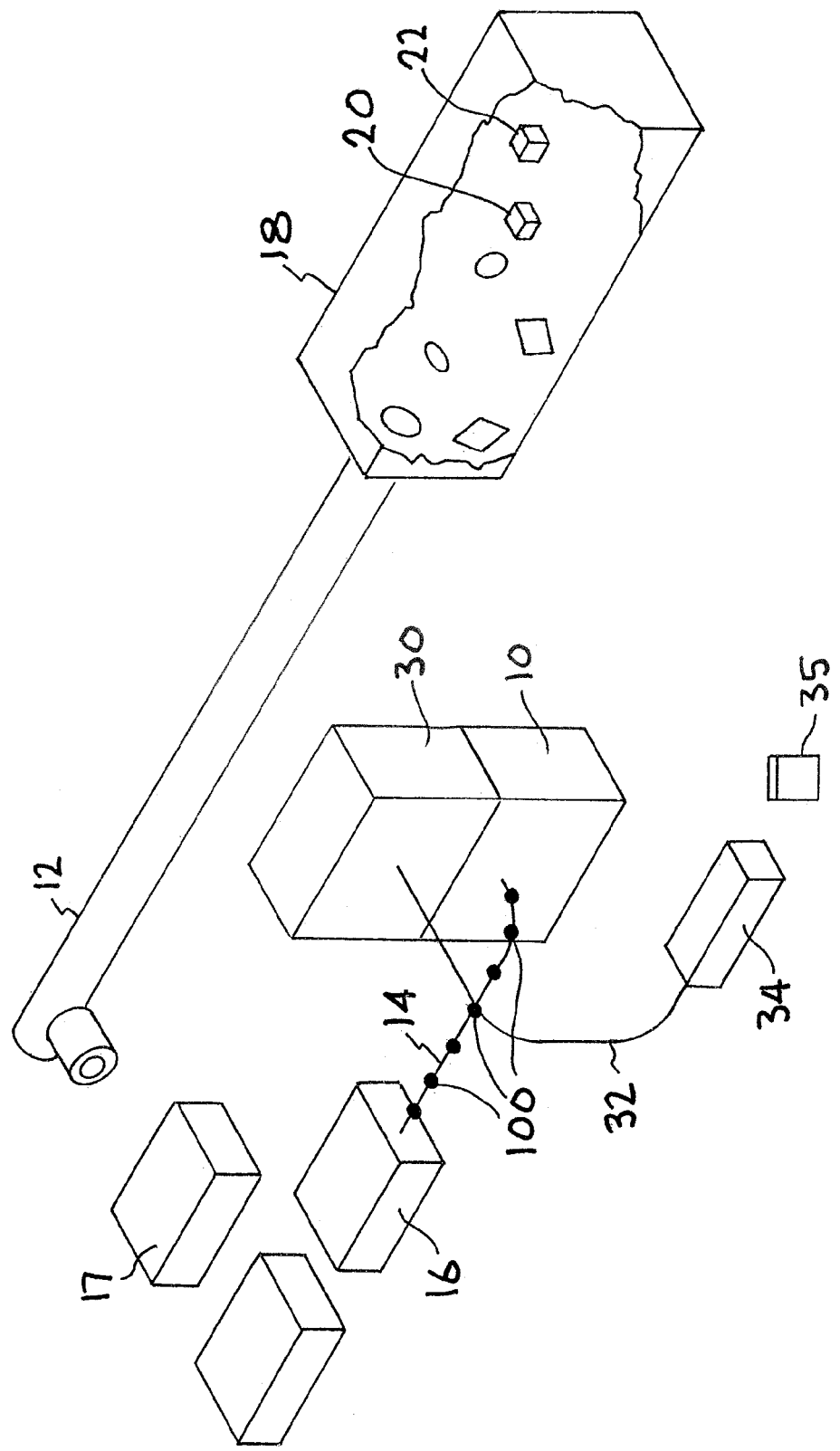
FIGS. 2 through 6 illustrate aspects of the operation of an embodiment of the invention.

FIG. 1 shows the basic components of an embodiment of the invention. A laser system in enclosure 10 is configured to drive a photo-gun of a linear accelerator 12. A fiber optic 14 (or other bulk optical arrangement) is provided to transport light from the laser system to an amplifier in enclosure 16. Light from the amplifier is then directed to a frequency conversion means in enclosure 17 to convert the light to an appropriate UV wavelength to drive the photo-gun. The e-beam output from the linear accelerator 12 is directed into an interaction chamber 18. The interaction chamber includes an interaction region and re-circulating optics and discussed below. An e-beam deflector 20 is provided to direct any residual e-beam toward a beam stop 22.

Referring still to FIG. 1, a laser system in enclosure 30 is configured to provide a long pulse length laser pulse which is directed by a fiber optic 32 (or other bulk optical arrangement) to an amplifier in enclosure 34. The beam from amplifier 34 is directed by mirror 35 through a beam splitter and through a frequency converter (the frequency converter could be omitted and the direct laser beam used if lower energy x-rays or gamma-rays are desired) in interaction chamber 18 and into the oncoming e-beam. The laser beam interacts with the e-beam to produce x-rays or gamma rays.

FIGS. 2 through 7 illustrate aspects of the operation of an embodiment of the invention. Laser system 10 provides mode-locked pulses 100 into fiber optic 14. Pulses 100 are provided at a frequency that is matched to the RF frequency of the linear accelerator 12, nominally 10 GHz. Alternately, an approximately 10 GHz laser pulse train can be generated by modulation of a CW laser via high speed electro-optic components driven by the accelerator RF frequency or a multiple thereof. Subsequent non-linear effects can be used to reduce the pulse duration of the individual 10 GHz pulses to durations required to produce bright electron bunches from the photo-cathode, e.g., approximately 1 ps. Synchronization of the mode locked laser and the accelerator RF must be on the order of a fraction of the pulse duration of the pulse hitting the cathode, i.e., nominally 100 fs accuracy. The wavelength of the light from laser system 10 is 1053 nm in this embodiment.

Figure 3:
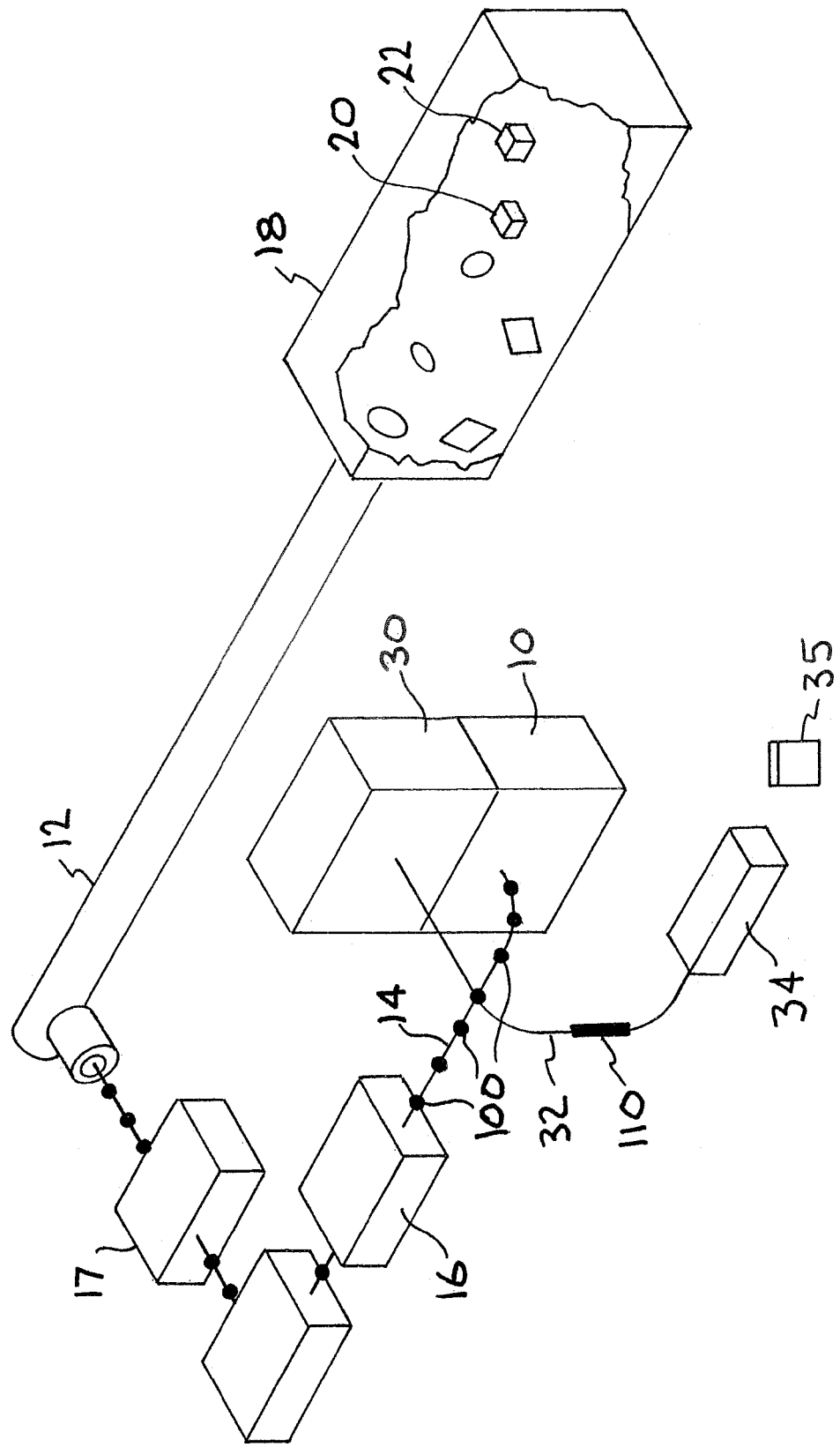
Figure 4:
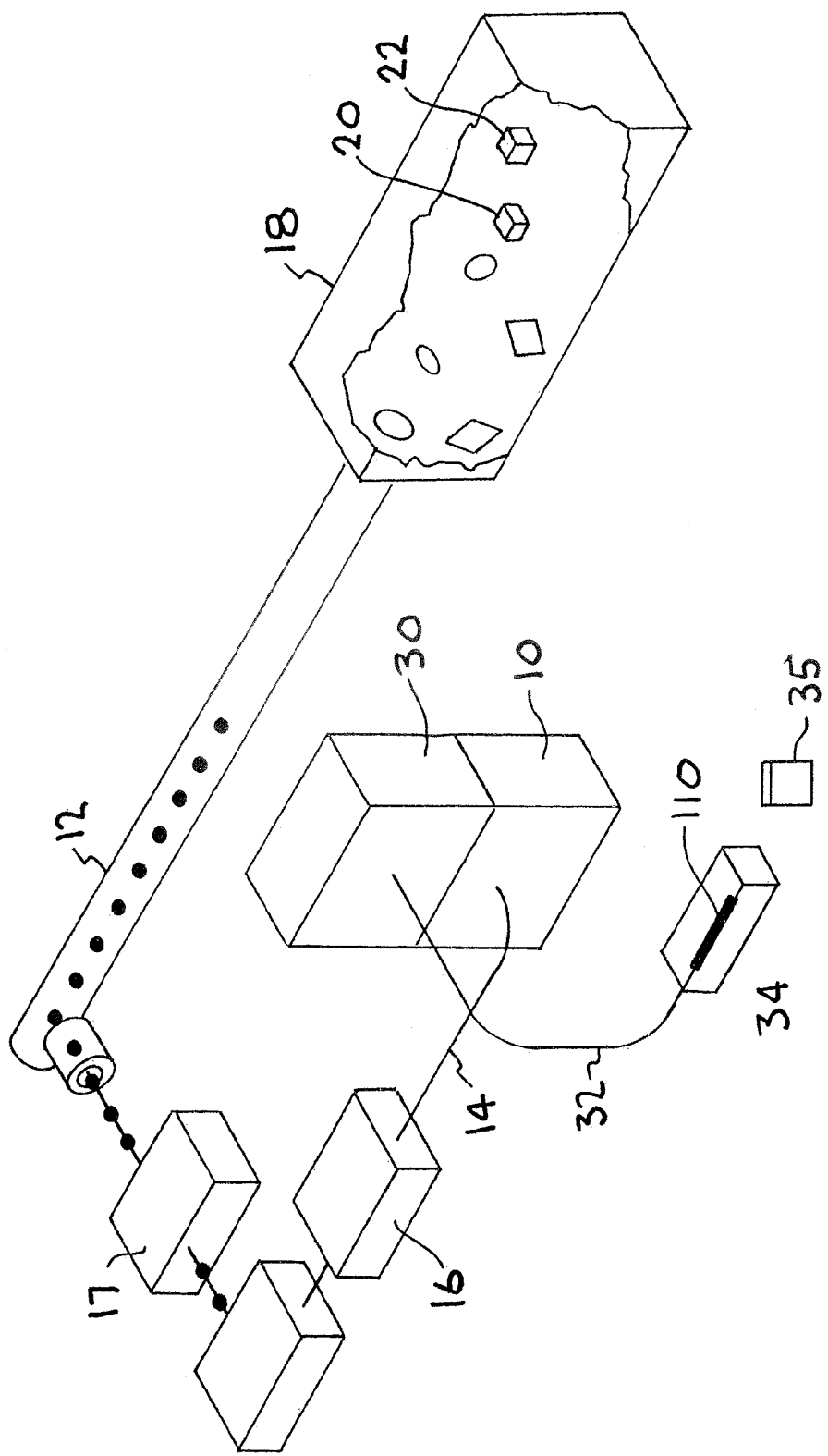

FIG. 3 shows pulses 100 passing through amplifier enclosure 16 and then through conversion means enclosure 17 from which pulses 100 are directed into linear accelerator 12. The wavelength used to drive the photo-gun is in the UV and depends upon the cathode material used. If the Cathode material is copper, then the wavelength would be the 4th harmonic of 1053 nm. If the cathode material is magnesium, then the wavelength would be the 3rd harmonic of 1053 nm. The pulse duration is nominally a 2 ps square pulse with a 100 fs rise and fall. Other pulse shapes are also possible and depend upon the cathode design and cathode dynamics. The laser drive pulse repetition rate is the same as the RF of the accelerator. The inventors have used the SLAC x-band standard of 11.424 GHz but the invention would work for an arbitrary repetition rate. If the repetition rate is too slow, then the spacing of the electron bunches becomes too big and might be larger than the transit time through the interaction region. Higher repetition is possible but good accelerator structures beyond about 12 GHz have not yet been demonstrated. The energy of the laser drive pulses depends upon the cathode material quantum efficiency. For copper, about 50 microJoules per pulse are needed. Magnesium is 10× more efficient and thus, only around 5 microJoules are needed. These energies may vary by factors of 2 to 4 depending upon the accelerator structure. Basically, as much charge is placed in each bunch as possible without destroying the electron beam emittance. The quality of the gammas scale as the charge/emmittance$^2$, but the total flux is proportional to the charge. Amplifier 16 can in principle be done with either a bulk amplifier or a fiber amplifier or a combination of both. Because copper cathodes require more energy, it is likely that we would need a bulk amplifier at the end after the fiber preamplifiers. If a magnesium cathode is used, the pulses can be generated using only fiber laser amplifiers (obviously an advantage). The photo-gun is not shown, but is known in the art. One embodiment photo gun provide 25 pC charge electron bunches. The photogun must produce electrons in each RF bucket (i.e., each acceleration cycle) that are nominally the same charge, with identical energy and beam emittance. For purposes of this embodiment, the energies are identical if there is substantially no variation beyond about 10E-3. When the invention is used to make x-rays, a larger variation from bunch to bunch is tolerable.

In single bunch mode at x-band frequencies, the bunch charge should be ~250 pC. An embodiment of the invention in the multi-bunch mode of this invention is set up to operate at nominally 1/10th the bunch charge, i.e., 25 pC. Electron perturbations and issues in the accelerator scale in proportion to the square of the bunch charge so for the multi-bunch mode, these issues will be nominally 100× smaller.

Referring still to FIG. 3, laser system 30 is a Nd:YAG laser configured to provide a long pulse 110 at a wavelength of about 1064 nm. The laser system 30 is configured to provide sufficient energy and high average power. The intensity is in the joule per pulse range for a 10 ns pulse. The bandwidth is less than the desired gamma-ray bandwidth, typically 10E-3. This bandwidth is easy for a 10 ns pulse. Note that the use of narrower bandwidth is not beneficial because the interaction geometry also broadens the gamma-ray bandwidth by of order 10E-3. The exact laser pulse energy is dependent upon the interaction region focal spot size and length (the spot size and length are tied to each other via diffraction relations). Embodiments of a symmetric mode Compton source known as T-REX had a small spot size (~20 microns) and short confocal interaction region (cm's). The present embodiment uses focal spots of >100 microns and interaction lengths of order a meter or greater. As sown in FIG. 4, the laser pulse energy of pulse 110 is amplified by the amplifier, which is configured to produce between 1 to 10 Joules.

Figure 5:
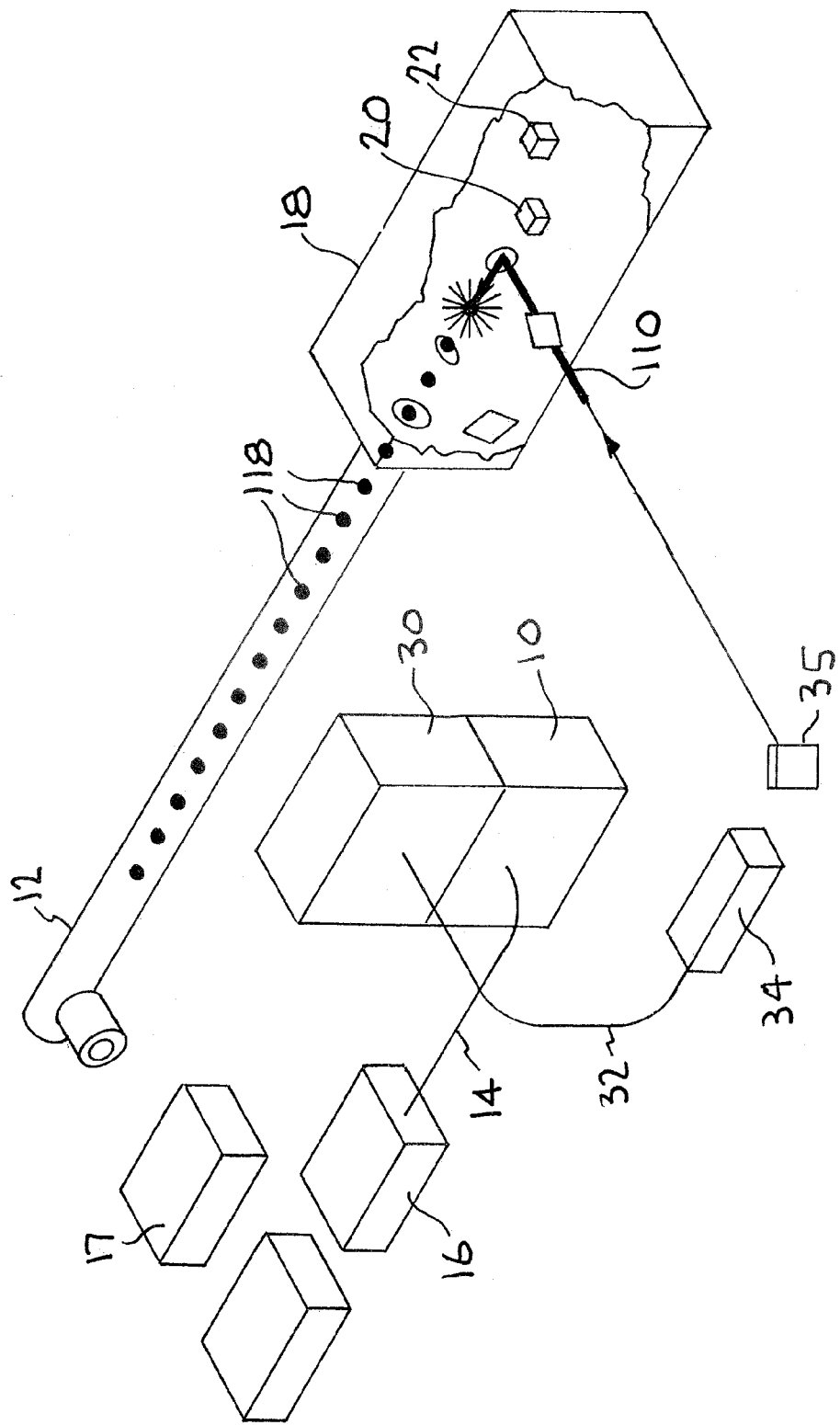
Figure 6:
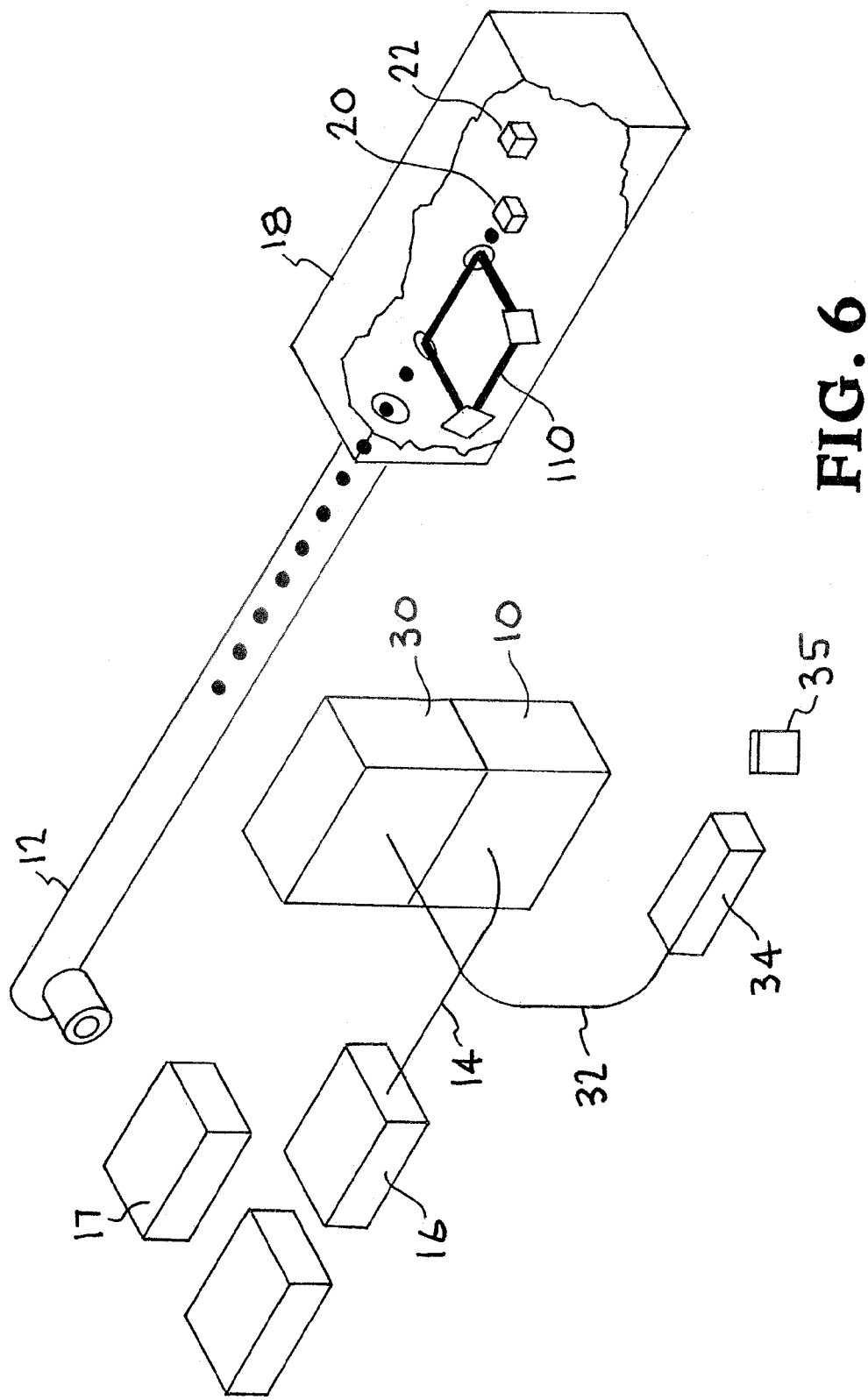
Figure 7:
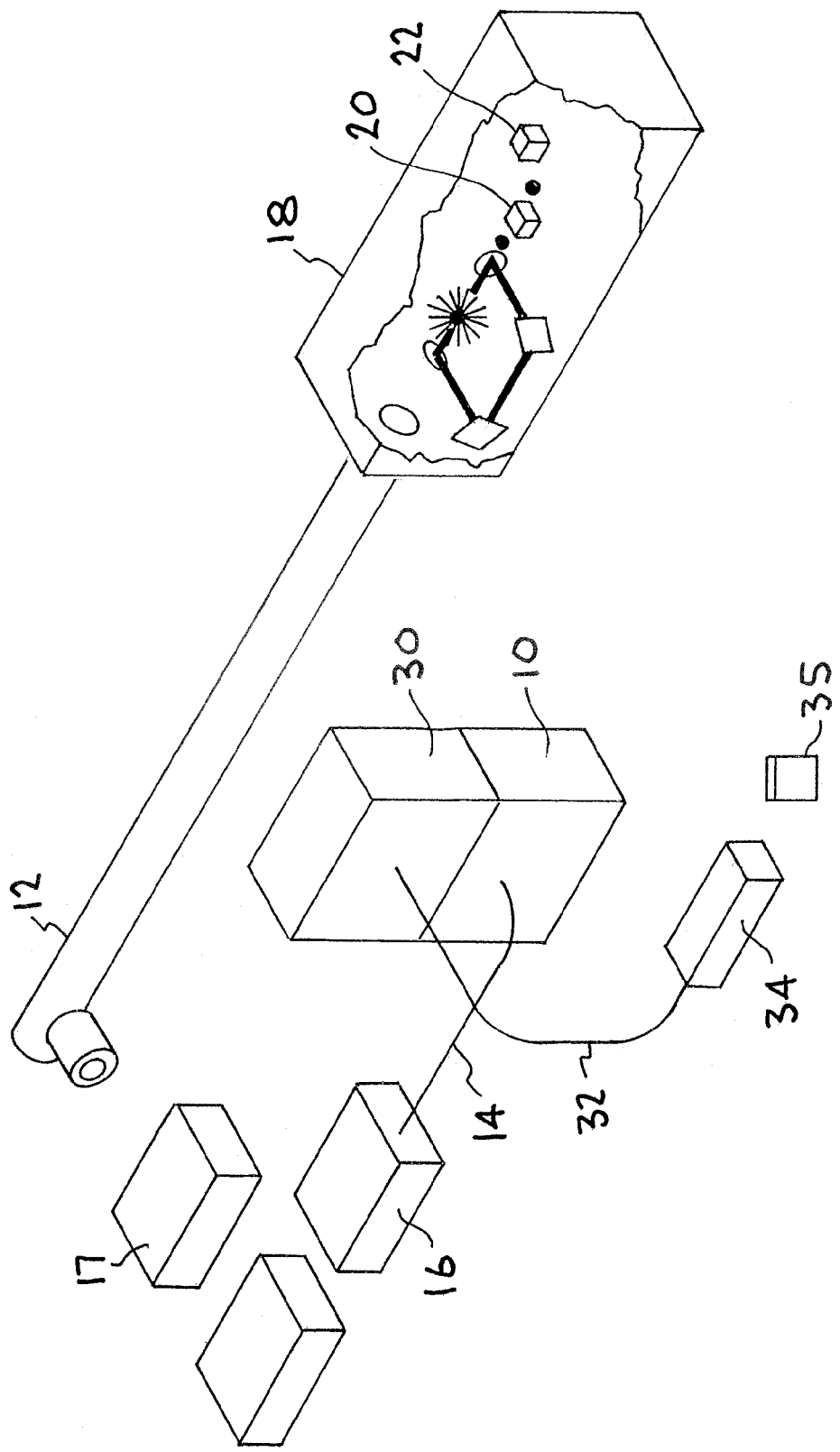
FIG. 7 shows the pulse circulating through the cavity to interact with the remainder of the electron bunches.

As shown in FIG. 5, after amplification, pulse 110 is directed into interaction chamber 18 where it passes through a the beamsplitter and the conversion element to then be reflected into the path of the oncoming electron bunches 118. As shown in FIG. 6, the pulse 110 is recirculated within the interaction chamber 18. The laser pulse duration is chosen to be equal to the total length of the total electron bunch train (also known as the macro-bunch length) or some integer sub-multiple of the bunch train length. One could artificially create an 87.5 ns interaction with shorter duration laser pulses by collecting the laser light after the interaction region and re-circulating it to interact with subsequent electron bunches. The cavity can be constructed out of high reflective mirrors, one polarizer and a pockels cell. Pulse 110 consisting of polarized light can be injected into the cavity via the polarizer. The polarization is then be rotated 90 degrees by the Pockels cell and the light would is trapped. The scattered light is polarized and tunable by changing either the color of the laser photon or the energy of the electron bunch. The output is polychromatic but with a spectrum that is angle correlated. By passing the beam through a narrow aperture a quasi-mono-energetic beam can be created with a bandwidth that is dependent linearly upon the laser bandwidth, linearly upon the electron bunch energy spread and upon the focusing geometry of the electron beam and the laser beam. As shown in FIG. 7, the pulse 110 continues to circulate through the cavity to interact with the remainder of the electron bunches.

In practice, this configuration has been dubbed the "fill every bucket" configuration since ultimately one would put electrons in every "RF" bucket of the accelerator structure, i.e., there would be one electron bunch for every cycle of the RF frequency driving the accelerator. Because the length of the focal region is constrained by geometrical optics and free space diffraction of laser beams, in practice the laser-electron interaction is not a free parameter and is typically 1 meter in length. For this reason it is advantageous to operate the accelerator at as high an RF frequency as practical. Accelerator operation is limited by field-driven breakdown of accelerator structures and this in turn depends upon frequency. The highest practical frequency that accelerators currently operate is x-band (nominally 12 GHz). The invention has been designed with devices that operate in the x-band at 11.424 GHz. At this frequency the spacing between electron bunches is 87.5 ps or approximately 3 cm separation in space. Thus a 1 meter focal interaction region will contain at any one time approximately 34 electron bunches. The laser pulse duration can be chosen to be equal to the total length of the total electron bunch train (also known as the macro-bunch length) or some integer sub-multiple of the bunch train length. For 1000 bunches, the laser pulse duration is approximately 87.5 ns. One could artificially create an 87.5 ns interaction with shorter duration laser pulses by collecting the laser light after the interaction region and recirculating it to interact with subsequent electron bunches. In practice, the use of high frequency RF accelerators also results in smaller transverse electron beam size (typically 100 microns in diameter). The size of the electron beam exiting the accelerator is nearly the focal spot size of the laser in the interaction region. As a result, the required electron beam focusing in the interaction region is both small and easy to perform.

The invention provides many advantages in addition to those described above. The use of 1000× and longer duration laser pulses in the interaction region reduces dramatically the potential for laser damage on the vacuum windows through which the laser enters the interaction region, the mirror by which the laser is directed in the interaction region and the optics by which the laser is focused into the interaction region. Laser pulses of such long duration enable the use of simpler and less expensive refractive optics for focusing of the laser pulse in the interaction region. One present embodiment uses off axis parabolic mirrors for focusing. These longer duration laser pulses dramatically (1000× reduction) reduce the timing requirements for the laser relative to the electron bunch. The use of low charge electron bunches enables simpler beam deflection structures in the accelerator, which helps eliminate dark current electrons and dark current sources of high energy background photons. These low charge electron bunches reduce the energy requirements on the photo-gun drive laser that creates the electrons at the beginning of the accelerator and is compatible with existing, robust fiber laser technology. The use of long pulse lasers for the interaction laser reduces the complexity of the interaction laser system by eliminating the need for chirped pulse amplification. The use of larger interaction spot sizes and longer interaction laser-electron interaction regions creates a significantly more collimated gamma-ray or x-ray output (10 microradians or less for the narrowest bandwidth). The collimated output of this geometry is readily compatible with gamma-ray and x-ray lens technology as well as with narrowband gamma-ray spectrometer technology. Gamma-rays produced by this geometry can have a fractional bandwidth of 10E-3 or less. The use of this invention with lower energy accelerators, e.g., 40 MeV machines, allows the production of extremely high flux, tunable x-ray radiation.

The foregoing description of the invention has been presented for purposes of illustration and description and is not intended to be exhaustive or to limit the invention to the precise form disclosed. Many modifications and variations are possible in light of the above teaching. The embodiments disclosed were meant only to explain the principles of the invention and its practical application to thereby enable others skilled in the art to best use the invention in various embodiments and with various modifications suited to the particular use contemplated. The scope of the invention is to be defined by the following claims.

I claim:

1. An x-ray or gamma-ray source comprising:
   an electron source for generating a train of spaced electron bunches;
   an RF linear accelerator adapted to accelerate said electron bunches into a laser-electron beam interaction region, wherein the transit time of each of the accelerated electron bunches through the laser-electron beam interaction region is both greater than the duration of the accelerated electron bunch and greater than the spacing between electron bunches; and
   a laser system adapted to produce a laser pulse having a duration at least as long as a transit time of the laser pulse through the laser-electron beam interaction region, said laser system arranged so that the laser pulse traverses the laser-electron beam interaction region to interact with all of the accelerated electron bunches of the train and thereby produce high flux beams of bright, tunable, polarized quasi-monoenergetic x-ray or gamma-rays via laser-Compton scattering.

2. The x-ray or gamma-ray source of claim 1, wherein the duration of the laser pulse is substantially equal to at least a total length of the train of spaced electron bunches so that a single pass of the laser pulse through the laser-electron beam interaction region interacts with all of the accelerated electron bunches of the train.

3. The x-ray or gamma-ray source of claim 1, wherein the duration of the laser pulse is substantially equal to a sub-multiple of a total length of the train of spaced electron bunches and the laser system is arranged to recirculate the laser pulse through the laser-electron beam interaction region for a predetermined number of passes equal to an inverse of the sub-multiple.

4. The x-ray or gamma-ray source of claim 1, wherein the spacing frequency of the electron bunches is the same as or correlated to the RF frequency of the RF linear accelerator so that an electron bunch is present for every cycle of said RF frequency.

5. The x-ray or gamma-ray source of claim 1, wherein said RF linear accelerator is operated in the x-band.

6. The x-ray or gamma-ray source of claim 1, wherein said accelerator is operated nominally at about 12 GHz.

7. The x-ray or gamma-ray source of claim 1, wherein said accelerator is operated nominally at about 11.424 GHz.

8. The x-ray or gamma-ray source of claim 1, wherein said gamma-rays comprise a fractional bandwidth of 10E-3 or less.

9. The x-ray or gamma-ray source of claim 1, wherein said electron source comprises a photo-gun.

10. The x-ray or gamma-ray source of claim 9, wherein said photo-gun is driven by a laser that operates at the RF frequency of the RF linear accelerator.

11. A method for producing high flux beams of bright, tunable, polarized quasi-monoenergetic x-ray or gamma-rays via laser-Compton scattering, comprising:
    generating, with an electron source, a train of spaced electron bunches;
    accelerating, with an RF accelerator, said electron bunches into a laser-electron beam interaction region to produce accelerated electron bunches, wherein the transit time of each of the accelerated electron bunches through the laser-electron beam interaction region is both greater than the duration of the accelerated electron bunch and greater than the spacing between electron bunches; and
    producing, with a laser system, a laser pulse having a duration at least as long as a transit time of the laser pulse through the laser-electron beam interaction region, said laser system arranged so that the laser pulse traverses the laser-electron beam interaction region to interact with all of the accelerated electron bunches of the train and thereby produce high flux beams of bright, tunable, polarized quasi-monoenergetic x-ray or gamma-rays via laser-Compton scattering.

12. The method of claim 11, wherein the duration of the laser pulse is substantially equal to at least a total length of the train of spaced electron bunches so that a single pass of the laser pulse through the laser-electron beam interaction region interacts with all of the accelerated electron bunches of the train.

13. The method of claim 11, wherein the duration of the laser pulse is substantially equal to a sub-multiple of a total length of the train of spaced electron bunches and the laser system is arranged to recirculate the laser pulse through the laser-electron beam interaction region for a predetermined number of passes equal to an inverse of the sub-multiple.

14. The method of claim 11, wherein the spacing frequency of the electron bunches is the same as or correlated to the RF frequency of the RF linear accelerator so that an electron bunch is present for every cycle of said RF frequency.

15. The method of claim 11, wherein said RF linear accelerator is operated in the x-band.

16. The method of claim 11, wherein said accelerator is operated nominally at about 12 GHz.

17. The method of claim 11, wherein said accelerator is operated nominally at about 11.424 GHz.

18. The method of claim 11, wherein said gamma-rays comprise a fractional bandwidth of 10E-3 or less.

19. The method of claim 11, wherein said electron source comprises a photo-gun.

20. The method of claim 19, wherein said photo-gun is driven by a laser that operates at the RF frequency of the RF linear accelerator.

21. The method of claim 11, wherein said election bunches are not focused.

22. The method of claim 21, wherein said electron bunches comprise a beam diameter of about 100 μm in said laser-electron beam interaction region.

* * * * *